March 27, 1956 A. C. VINE 2,739,477
APPARATUS FOR MEASURING BUOYANCY
Filed Oct. 2, 1953 3 Sheets-Sheet 2
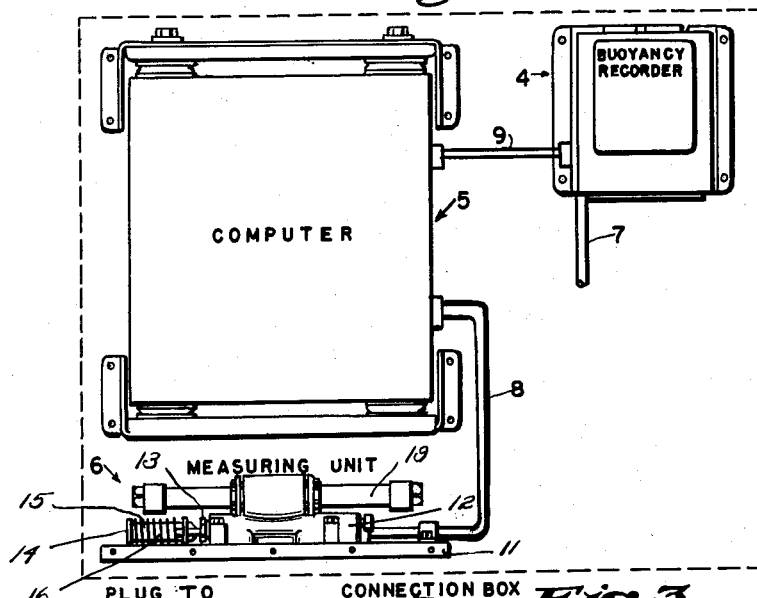
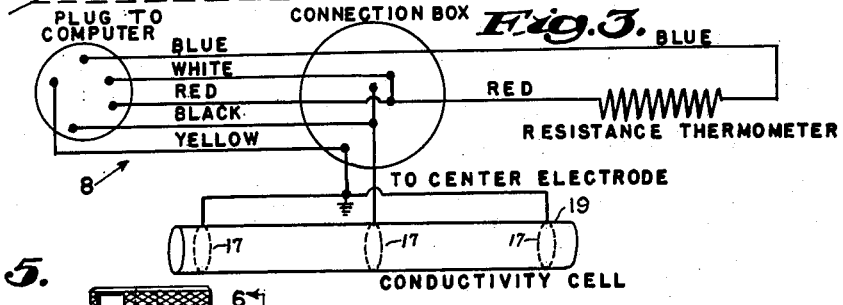
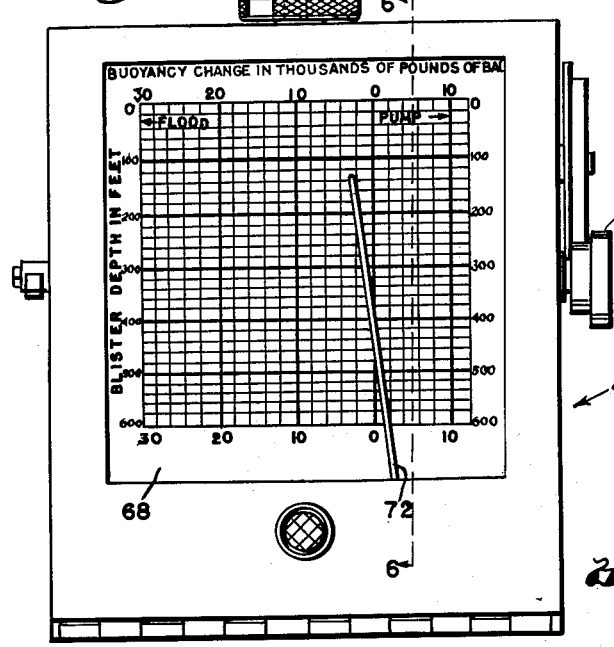
Inventor:
Allyn C. Vine,
by *W. R. Malcolm*
*D. G. Taylor Jr.*
Attorneys March 27, 1956  A. C. VINE  2,739,477
APPARATUS FOR MEASURING BUOYANCY
Filed Oct. 2, 1953  3 Sheets-Sheet 3

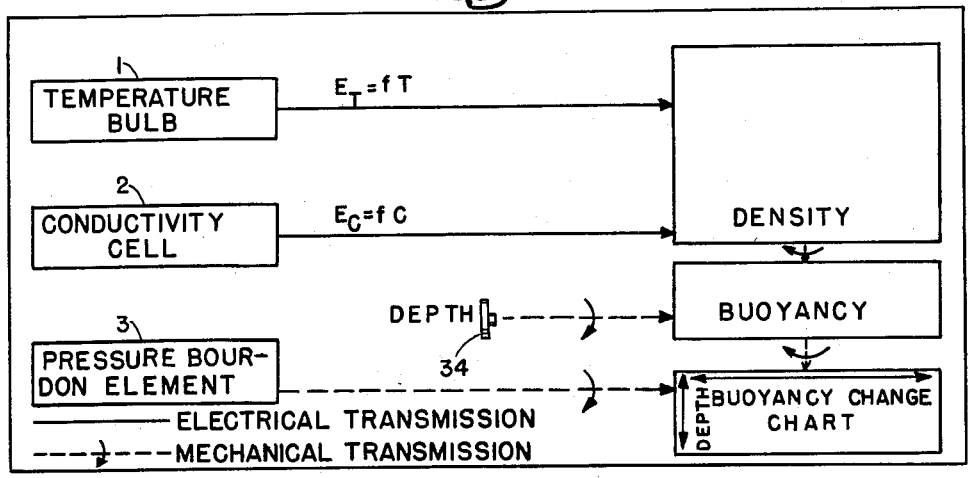
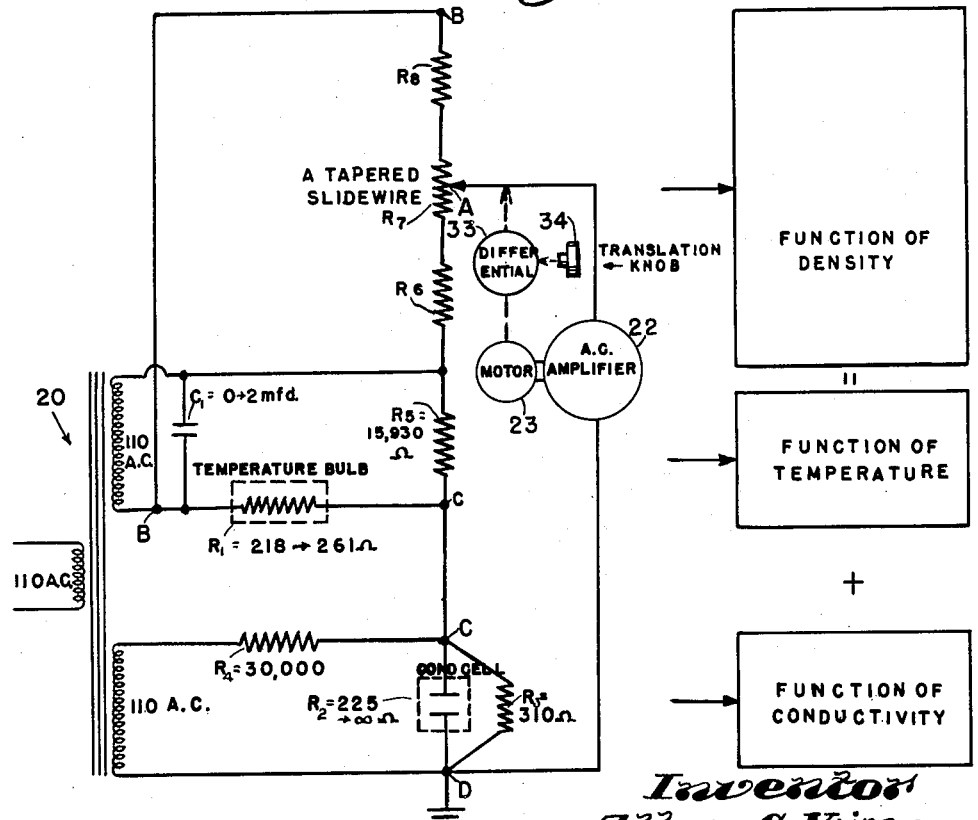

LOGARITHMIC CAM DRIVE

*Inventor:*
ALLYN C. VINE by W. R. Maltby
D. C. Snyder
*Attorneys*

United States Patent Office 2,739,477
Patented Mar. 27, 1956

2,739,477

APPARATUS FOR MEASURING BUOYANCY

Allyn C. Vine, Woods Hole, Mass., assignor to the United States of America as represented by the Secretary of the Navy Application October 2, 1953, Serial No. 383,946

2 Claims. (Cl. 73—178)

This invention relates to an apparatus for recording sea water variables which are important in connection with submarine diving and trim-setting operations involving a change of ballast.

When operating a submarine under water, it is exceedingly important to know as accurately as possible what the buoyancy of the vessel may be in order to maintain the vessel at a desired depth or to facilitate other types of operation. A vessel in good trim, at a given point under water, is said to have zero buoyancy. If the vessel moves to different depths or to a point where the density of the sea water changes, then a change in ballast becomes necessary in order to re-establish zero buoyancy. Change in ballast is also dependent upon the hull compressibility of the submarine as well as density of sea water, and the latter value in turn depends upon calculations involving the mutual relations of other sea water variables such as temperature, salinity and pressure. Inasmuch as sea water variables such as temperature, pressure, salinity and the like, measured in one region in sea water, may vary appreciably from similar determinations taken at different regions, it becomes very difficult to record changes in these variables and to make calculations rapidly which can be relied upon to determine ballast changes during the operation of a submarine. A somewhat analogous situation prevails with respect to making sound velocity determinations under water.

It is a general object of the invention to utilize a simplified method of dealing with the problem indicated by continuously and rapidly measuring the temperature and conductivity of the ambient sea water and deriving from these measurements other variables, such as salinity, density, buoyancy, and sound velocity, as predetermined functions of the measured variables.

It is a further general object of the invention to provide a positive, efficient and reliable instrument by means of which desired sea water variables are continuously measured and automatically computed to present accurate indications of ballast changes required to establish and maintain zero buoyancy at different stations under water.

In a more specific aspect, the invention is concerned with the provision of a relatively simplified method which constitutes a substantial improvement over the method of computing described and claimed in my Patent No. 2,579,220, issued December 18, 1951, and the apparatus disclosed in co-pending patent application by Vine et al., Serial No. 379,748, filed September 11, 1953, which arrangement comprises a satisfactory means of providing the desired measuring and recording factors. However, the very considerable amount of equipment using a fairly large number of parts presents difficulties with respect to installation and service, as well as introducing the possibility of error, and involving initial heavy costs. The method of the present invention avoids several of the objectionable features of the earlier apparatus above noted by eliminating a part of the electrical equipment which was previously thought to be essential.

One important feature of the invention is the combination of a recording mechanism and a simplified self-balancing potentiometric circuit which controls the movement of a recording pen in accordance with the algebraic sum of a series of voltages, each of which, in turn, corresponds to a specific measured sea water variable.

Another important aspect of the invention is the automatic self-balancing computing circuit in which a normally balanced electrical network is arranged such that unbalance voltages corresponding to the primary measurements of temperature and conductivity changes are opposed by a voltage change developed at the sliding contact of a slide wire through which a predetermined current is flowing. A conventional alternating current servo system responsive to the difference of the voltage between the unbalance voltages and the slide wire contact voltage acts to adjust the slide wire contact position in accordance with a predetermined function of the originally measured variables until the difference voltage is zero and the network is rebalanced. The slide wire contact position thus serves to indicate the result of the desired computation and the adjustment of the slide wire contact also acts to adjust the position of an indicator pointer or pen arm with respect to a suitable scale.

Other objects and many of the attendant advantages of this invention will be readily appreciated as the same becomes better understood by reference to the following detailed description when considered in connection with the accompanying drawings wherein:

Fig. 1 is a functional diagram indicating the measuring elements employed to determine sea water variables and further illustrating the manner in which several variables are combined;

Fig. 2 is a composite view indicating in one assembly the several component parts of the measuring and recording apparatus;

Fig. 3 is a wiring diagram of the temperature and conductivity measuring elements illustrated in Fig. 2;

Fig. 4 is a circuit diagram indicating electrical and mechanical components of an operating circuit suitable for carrying out the method of the invention;

Fig. 5 is an elevational view of the recorder element further showing a buoyancy chart mounted in a recording position;

Figure 6:
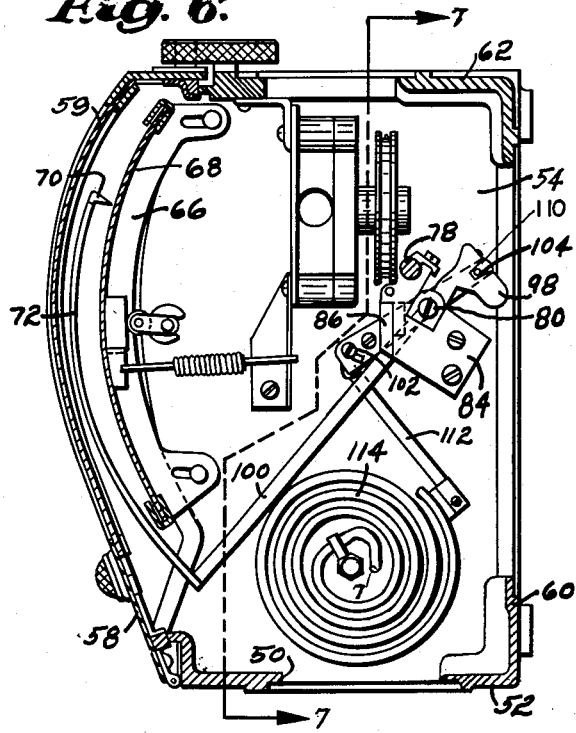
Fig. 6 is a vertical cross-sectional view taken on the line 6—6 of Fig. 5.

Referring more in detail to the drawings, the more essential functions of the apparatus of the invention have been diagrammatically illustrated in Fig. 1. As indicated therein, the sea water variables of electrical conductance, temperature and pressure are measured by elements 1, 2 and 3, respectively, and these variables are referred to as the measured quantities. From the primary measurement of electrical conductance and temperature, as electrical resistance values, and with the aid of existing sea water data, certain related variables are derived in accordance with an empirical relationship as corresponding electrical voltages, thus, $E_T$ is obtained as a function of temperature and $E_C$ is obtained as a function of conductance. These derived variable voltages are combined in accordance with the above-mentioned empirical relationship to provide indications representing more complex sea water conditions, such as salinity and density, which, in conjunction with a mechanically translated sea water pressure measurement, provide for movement of the indicator pointer or recording pen and thus furnish an indication of the buoyancy of the vessel as well as an indication of balance changes which may be necessary to maintain zero buoyancy.

In deriving electrical voltages which will properly correspond to those measured quantities to yield density, it is necessary to employ certain mathematical functional relationships which are best represented in the form of an empirical equation. The mathematical functions employed to derive a relationship between density, temperature and salinity are deduced from established oceanographic tables containing these data. The effects of depth and density are similarly obtained. Reference may be made, for example, to H. U. Sverdrup, M. W. Johnson and R. H. Fleming, "The Oceans," Prentice-Hall, Inc., N. Y., 1942, pages 47 to 57. In U. S. Patent No. 2,579,220, and in my co-pending application, referred to above, a method of computation is disclosed in which the measurement of electrical conductivity of the sea water is compensated for changes in temperature to obtain an indication of salinity. A further compensation as a function of temperature is made to the indication of salinity to derive therefrom an indication of density and, finally, the indication of density is compensated for depth to obtain buoyancy. The mathematical equations involved are obtained from an empirical relationship and the values of the constants are selected to provide minimum error in the region of salinities which are commonly encountered in the ocean. However, the method and apparatus so disclosed involves equipment of considerable complexity.

In order to obtain a simpler method and apparatus, certain simplifying assumptions may be made without materially altering the accuracy of the computation. For example, it has been found that the volume of a submarine hull is not appreciably altered by change in temperature during the normal dive. Therefore, changes in buoyancy can be placed equal to change in density of the sea water times the volume displacement of the hull plus the change in depth times the hull compression factor. Further, it is convenient to consider hull compression as the difference between actual hull compression and the compression of the displaced water. Also, inasmuch as the buoyancy changes due to hull compression are linear with depth, they can be treated separately from the buoyancy changes due to changes in temperature and electrical conductivity of the salt water, and can be later added to the indication of density obtained from the measuring unit. An instrument, therefore, can be devised which computes density from measurements of temperature and conductivity in accordance with a greatly simplified mathematical relationship, to which a correction can be added manually for changes in depth such that the resultant reading is substantially in agreement with the established oceanographic tables.

When data relating to temperature, conductivity and salinity are plotted, a family of curves are obtained which approximates the form of a hyperbola. Since these relationships are nonlinear and complex, it is difficult to obtain an exact equation expressing the function. Consequently, an empirical approximation is employed. Similarly, the density of sea water is found to be related as a function of temperature and salinity. I have discovered that the complete family of curves referred to above can be approximated with reasonable accuracy by an empirical equation of the form $$\sigma = K_1 \left[ \frac{\sqrt{(C+K_2)^2 - K_3}}{K_4 T^n} \right] - K_5$$

where $\sigma$=density, $C$=conductivity, $T$=temperature, and $K_1$, $K_2$, $K_3$, $K_4$, $K_5$, and $n$ are empirically obtained constants having values, for example, $K_1=897.9$, $K_2=0.815$, $K_3=0.006847$, $K_4=0.003296$, $K_5=20$, $n=1.07$, selected to give minimum error for densities commonly occurring. It will be noted that this equation differs materially in form from the one used in my co-pending application referred to above to compute salinity:

$$\text{Salinity} = \left( \frac{100,000}{25.661 + 0.7372T} - 348.87 \right) C^{1.0946}$$

The principal parts of the instrument employed in carrying out the foregoing functions are shown in the assembly view of Fig. 2 and include a buoyancy recording unit 4 which is designed for mounting on the diving panel of a submarine, an electrical computer unit 5 which may be located at any desired point within the hull of a submarine, and a measuring unit 6 which is installed at some suitable point on the exterior surface of the hull of the submarine; a sea pressure conduit 7 is independently connected to the recorder unit 4. The measuring unit 6 is similar in numerous details to the unit described by A. W. Jacobson in "Trans. A. I. E. E.," vol. 67, 1948," An instrument for recording continuously the salinity, temperature and depth of sea water." A base plate 11 is shown which is adapted to be secured at some convenient point along the exterior surface of a submarine, for example, at the underside of the vessel's hull, as near the central portion as possible. In this position, the measuring elements are constantly exposed to contact by sea water conditions in which the submarine is immersed. If desired, the base plate may be enclosed by a perforated cover, not shown in the drawings, of sufficient strength and rigidity to withstand normal sea water pressures commonly encountered in the operation of submarines. Supported on base plate 11 is a pressure resistant housing 12 in which electrical connections may be made.

Extending outwardly from the terminal head and fitting is a resistance thermometer bulb comprising a tubular element 14 which supports an open bronze frame consisting of fins 15 about which is wound a helical capillary tube 16.

Located within the capillary tube 16 are several strands of insulated nickel wire. The electrical resistance of the nickel wire is chosen in accordance with the usual practices of the temperature measuring art so that its resistance in normal operation varies approximately from 218 ohms to 261 ohms. One end of the capillary tube 16 is sealed and the other end is soldered into the center core and the leads from the wire are carried through the core to the terminal head.

A valuable characteristic of this temperature measuring arrangement has been found to be a remarkably high speed of response of the bulb to temperature changes, a factor which is very essential in carrying out rapid calculation of the sort described.

Mounted above the temperature bulb, as shown in Fig. 2, is an electrical conductivity measuring device which is supported on the upper part of the pressure-resistant housing 12, and consists of a tubular member 19.

As shown more clearly in Fig. 3, the conductivity cell is made of tube 19 enclosing three metallic disks 17 axially spaced and insulated to function as electrodes and to which an energizing potential may be applied. Electrodes 17 are preferably made of a noble metal such as platinum. Sea water is permitted to flow freely through the conductivity cell. The lead to the center electrode is insulated and approximately half of the current in this lead flows through the sea water sample to each end electrode. The two paths from the center electrode being in parallel, the measured conductance is the sum of the conductance of these paths. Inasmuch as the two end electrodes are grounded and thus short-circuited together, they are at the same potential and no current can flow between them through any external shunt path. With a fixed applied potential, the electric current in the wire connected to the center electrode is determined by the specific conductance of the sea water and by the dimensions of the cell and its electrodes. Since the dimensions of the cell are constant, the electric current can be used as a measure of the specific conductance and the number by which the measured conductance is multiplied to give the specific conductance is called the "cell constant." While cells of similar design can be readily made with constants within two or three percent of each other, it is expedient for accurate measurements to make an individual calibration for each individual cell before use.

Figure 8:
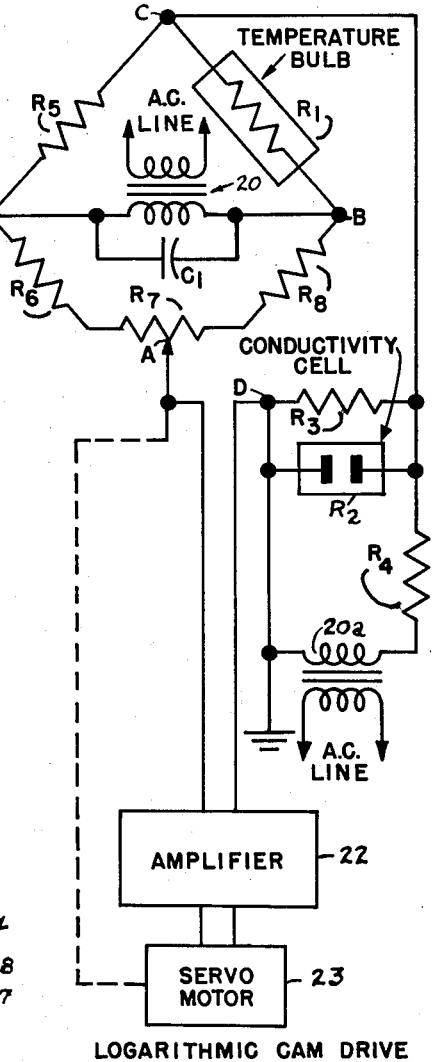
Fig. 8 is a simplified wiring diagram.

Fig. 3 of the drawings also illustrates wiring connections for cable 8 by which the electrical connections are made from the measuring unit 6 to the computer 5 of Fig. 2. It will be seen that the conductivity measuring unit 19 and the temperature measuring unit 16, if energized from a suitable alternating current source as shown in Fig. 8, will each reflect indicative voltage changes which may be electrically combined in accordance with the steps suggested in Fig. 1 to derive a density indication. Further, it will be noted that the density indication so obtained can be compensated for the measurement of depth to obtain an indication of buoyancy therefrom.

As noted above, computer 5 has been shown diagrammatically in Fig. 2 connected by cable 9 to buoyancy recorder 4 and by cable 8 to measuring unit 6. The computer 5 includes in its housing the fixed resistance elements of the electrical network of Fig. 4, such as amplifier 22, transformer 20, phasing condenser C1, a fuse assembly and an operating switch. Also, as shown in Fig. 2, the recorder unit 4 includes in its housing both the electrical network balancing mechanism and the mechanical pen-moving mechanism, further illustrated in Figs. 5 through 7, inclusive.

The construction and manner of operation of the recorder mechanism is explained in complete detail in the above-identified application of Vine et al. In general, the recorder is housed in a casing which includes base members 50 and 52 to which are fastened sides 54 and 56 and a hinged front panel 58 of curved formation and carrying a glass window 59. Numeral 60 denotes a detachable rear panel. Suitable connecting plugs are provided in the sides 54 and 56, as well as a top plate 62 for receiving therethrough electrical and mechanical connections to the instrument components contained in the casing. Supported on the inner, upper surface of the casing is a curved chart-holding mechanism 66 which is adapted to locate a chart 68 directly in front of the window 59, as seen in Fig. 5, and in position to receive thereon a pen 70 carried by a curved arm 72 which is, in turn, fixed to one end of a pivot rod 100. The latter member has its opposite end pivotally connected in a frame 90 carried by the sliding carriage 81 of the recorder actuating mechanism.

Figure 7:
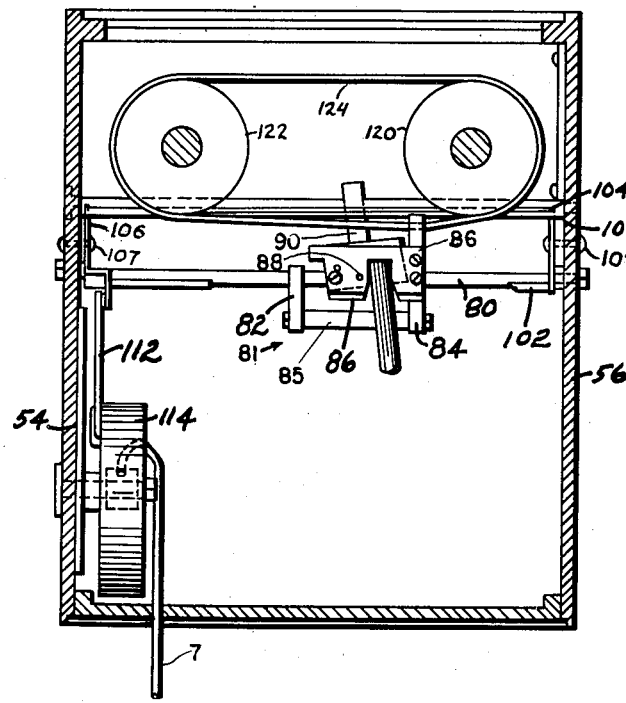
Fig. 7 is a cross section taken on the line 7—7 of Fig. 6.

Included in the actuating mechanism are two transverse parallel rods 78 and 80 which are firmly supported between the sides of the recorder casing, as shown in Figs. 6 and 7. Slidably mounted on these rods is carriage 81, consisting of plates 82 and 84 bolted to spacer 85 and supporting a front side 86. Pivoted on the front side 86 on a stud 88 is tilting frame 90. Arm 98 is pivotally mounted in frame 90 and has rigidly secured to its lower end pen support rod 100. Two additional transverse rods 102 and 104 are arranged parallel to each other and to rods 78 and 80. Rods 102 and 104 have their extremities rigidly secured in end plates 106 and 108, each of which plates is pivotally mounted in sides 54 and 55 by studs 107. The uppermost rod 104 is arranged so that it engages slot 110 in arm 98, whereby movement of shaft 104 by rotation of plates 106 and 108 on studs 107 in turn causes arm 98 to pivot in frame 90, thus moving rod 100 and pen arm 72 in a vertical direction over chart 68.

Attached to rod 102 at a point closely adjacent to end plate 106 is a link mechanism 112 which is in turn connected to a conventional Bourdon tube 114. With this arrangement, sea water pressure fluctuation acting through conduit 7 causes motion of Bourdon tube 114 at its free end which in turn actuates the link mechanism 112 and through the motion of pivoted rods 102 and 104 controls the vertical movement of pen arm 72. As described above, it is desirable to have the motion of pen arm 72 in a horizontal direction as linear as possible. Accordingly, in the present invention the desired function of density is taken from a linear motion by driving slide wire contact A through a cam 120 of a desired shape. A motor pulley 122 driven by servomotor 23 drives the cam 120 by means of cable 124 which is also attached to the carriage 81. The sliding carriage 81 is thereby moved by means of cable 124 to translate electrical changes into a horizontal displacement of the carriage 81 along the rods 78 and 80.

In the circuit diagram of Figs. 4 and 8, it will be noted that temperature bulb 16 is represented by resistance element R1 and is included as one arm of a resistance bridge which includes resistances R5, R6, R8 and slide wire resistance R7. In accordance with well-known practices in the temperature measuring art, the resistance values of R5, R6, R7, and R8 are selected to provide bridge arm ratios and resistance values such that the unbalance potential of the bridge caused by changes of thermometer bulb resistance correspond to the logarithm of the term $K_4T^n$ of the empirical equation given above. The resistance bridge so formed is energized by transformer 20 and the unbalance potential thereof is obtained between the sliding contact A and point C, the common connection of resistors R1 and R5. In series with the unbalance potential derived from the temperature measuring bridge is conductivity cell 19 represented in Fig. 8 by R2. It is evident that by suitable adjustment of series and shunt resistances R3 and R4, the voltage appearing across conductivity cell 2 when energized from transformer 20a can be made to vary in accordance with the logarithm of the conductivity term of the aforementioned empirical equation. With reference to Fig. 8, it is seen that the servo system consisting of amplifier 22 and servo motor 23 differs from a conventional self-balancing temperature measuring bridge by being responsive to the unbalance potential of the bridge plus a voltage derived from the measurement of the electrical conductivity and that the sliding contact A of slide wire R7 is not positioned to a voltage of balance for the bridge, but rather positioned to select a potential which is equal to the summation of the conductivity measurement voltage and the bridge unbalance voltage caused by temperature. This summation is a proper solution to the empirical equation derived above provided that equation is expressed in logarithmic form:

Log density = ½ log [$(C+K_2)^2 - K_3$] −
$$\log (K_4T^n) + \log K_5$$

This relationship can be seen to advantage when the circuit is drawn as illustrated in Fig. 4 wherein the voltage $E_T$ is developed between points B and C in accordance with the temperature function and voltage $E_c$ is developed between points C and D in accordance with the function of conductivity. The phase and polarity of the energizing voltages taken from transformer 20 are such the algebraic summation of voltage $E_T$ and $E_c$ is opposed by the voltage developed at A, the position of the sliding contact of slide wire R7 and point B. Point B thus is a common point and points A and D are connected as the input voltage to alternating current amplifier 22 of the servo system. A difference of voltage existing between points A and D is amplified and applied to energized motor 23 of the servo system which, in turn, adjusts sliding contact of slide wire R7 in such a direction that the network is balanced and the difference voltage becomes substantially zero. Suitable values for the electrical network of Fig. 4 are $R_1$ = 218 to 260 ohms
$R_2$ = 225 to infinite ohms
$R_3$ = 310 ohms
$R_4$ = 30,000 ohms
$R_5$ = 15,930 ohms
$R_6$, $R_7$, and $R_8$ taken together = 50,000 ohms
$C_1$ = 0 to 2 mfd.

As described above, it is desirable that the adjustment of the indicator or pointer of recorder 4 should be linear in order to make possible manual adjustments for hull compression to prevent scale expansion in a manner to be discussed later, and to provide a chart scale easy to read. Since with a cam drive as described above only a limited length of scale can be traversed and since the maximum change of water conditions in a typical submarine operation would not be taken care of thereby, it is necessary to expand the scale. Of several possible means of obtaining the desired result, one is by means of multi-turn potentiometer. The contact arm of the multi-turn potentiometer is positioned through a mechanical differential 33 by the servomotor for ordinary rebalancing within a single turn and also through the mechanical differential by a hand-operated knob 34 in accordance with the measured depth indication.

In operation, the submarine is first trimmed. The pen arm 72 is then adjusted to the zero ballast on chart 68 of Fig. 5. This may conveniently be done by mounting adjustment knob 34 so that it extends from the side of recorder 4. As the boat moves to a different depth, pen arm 72 traces a record of buoyancy versus depth. If the pen moves to the right of the chart as viewed in Fig. 5, the vessel is becoming heavier and ballast should be pumped out to regain trim. If pen arm 72 moves to the left, the vessel is becoming lighter and flooding of the ballast tanks is indicated. Ballast changes required for each subsequent change of depth is the difference between the chart reading at the new depth and the reading at the preceding depth.

Obviously, many modifications and variations of the present invention are possible in the light of the above teachings. It is therefore to be understood that within the scope of the appended claims the invention may be practiced otherwise than as specifically described.

What is claimed is:

1. Apparatus for computing and recording the value of the buoyancy of a submerged vessel according to a mathematical function $$\text{Buoyancy} = K_1\left[\frac{\sqrt{(C+K_2)^2-K_3}}{K_4 T^n}\right]+K_5+K_6 P$$

wherein $K_1$, $K_2$, $K_3$, $K_4$, $K_5$, $K_6$ and $n$ represent empirically obtained constants and C, T and P represent directly measured values of sea water temperature, electrical conductivity, and pressure, comprising, a potential source, means responsive to sea water temperature and energized from said source to produce a first voltage varying logarithmically in accordance with said predetermined function of temperature, an electrical conductivity cell exposed to said sea water and energized from said source to produce a voltage varying logarithmically in accordance with said predetermined function of conductivity, a voltage dropping resistance network energized from said source, said network including a slide wire having a movable contact to select a third voltage corresponding to the position thereof, a balancing network for combining the algebraic summation of said first and second voltages with said third voltage to obtain a difference voltage, motor means responsive to said difference voltage to adjust the position of said movable contact in a direction tending to reduce said difference voltage to zero whereby the position of said slider is an indication of the value of said buoyancy when said difference voltage becomes zero, pressure measuring means responsive to the liquid pressure at said submerged vessel, a scale, a pointer positioned in a first direction in accordance with the depth of said vessel and positioned by said motor means in a second direction at right angles to said first direction and arranged to coact with said scale to indicate the buoyancy of said vessel, and means varying the voltage selected at any given position of said movable contact in response to said indication of pressure to compensate the position of said movable contact for the depth of said vessel.

2. Apparatus for computing sea water properties such as salinity, density, and the like from measured sea water variables of electrical conductivity and temperature in accordance with a hyperbolic mathematical equation of the type $$fC \cdot fT = K_1\left[\frac{\sqrt{(C+K_2)^2-K_3}}{K_4 T^n}\right]+K_5$$

where $K_1$, $K_2$, $K_3$, $K_4$, $K_5$, and $n$ represent empirically obtained constants and C and T represent directly measured values of sea water electrical conductivity and temperature, respectively, comprising, in combination, first means including an electrical conductivity cell exposed to sea water and adapted to produce a first voltage corresponding to the term ½ log $[(C+K_2)^2-K_3]$, second means responsive to sea water temperature adapted to produce a second voltage corresponding to the term log $(K_4 T^n)$, a potentiometer having a movable contact and adapted to produce a third voltage corresponding to the position of said movable contact, a balancing network for combining the algebraic summation of said first and second voltages with said third voltage to produce a difference voltage, voltage sensitive means responsive to said difference voltage, said voltage sensitive means including motor means connected to said movable contact for adjusting the position of said movable contact in a direction tending to reduce said difference voltage to zero, whereby the position of said movable contact is a measure of the value of the sea water property when said voltage sensitive means produces zero response.

References Cited in the file of this patent

UNITED STATES PATENTS 1,472,125     Keeler _____ Oct. 30, 1923